United States Patent
Haseltine et al.

(10) Patent No.: US 6,530,662 B1
(45) Date of Patent: Mar. 11, 2003

(54) SYSTEM AND METHOD FOR ENHANCING THE REALISM OF A DISPLAYED IMAGE

(75) Inventors: Eric C. Haseltine, Burbank, CA (US); Alfredo M. Ayala, Jr., West Covina, CA (US); Peter Hastings, Los Angeles, CA (US)

(73) Assignee: Disney Enterprises, Inc., Burbank, CA (US)

(*) Notice: Subject to any disclaimer, the term of this patent is extended or adjusted under 35 U.S.C. 154(b) by 155 days.

(21) Appl. No.: 09/665,131

(22) Filed: Sep. 19, 2000

(51) Int. Cl.[7] ............... G03B 21/00; G03B 21/26; G03B 21/14; G02B 27/22; G02B 27/14

(52) U.S. Cl. .................. 353/5; 353/10; 353/28; 353/29; 353/62; 353/80; 359/478; 359/630; 359/631

(58) Field of Search ............... 353/5, 10, 28, 353/29, 62, 80; 359/478, 630, 631, 635, 639

(56) References Cited

U.S. PATENT DOCUMENTS

| | | | | |
|---|---|---|---|---|
| 1,481,006 A | | 1/1924 | Hammond | 359/475 |
| 4,805,895 A | | 2/1989 | Rogers | 272/10 |
| 5,172,251 A | * | 12/1992 | Benton et al. | 359/9 |
| 5,291,297 A | | 3/1994 | Steinmeyer | 348/44 |
| 5,400,177 A | | 3/1995 | Petitto et al. | 359/451 |
| 5,421,583 A | | 6/1995 | Gluck | 273/293 |
| 5,644,414 A | | 7/1997 | Kato et al. | 359/22 |
| 5,913,591 A | * | 6/1999 | Melville | 353/28 |
| 5,944,403 A | | 8/1999 | Krause | 353/74 |
| 6,206,524 B1 | * | 3/2001 | Jacob | 353/43 |
| 6,323,971 B1 | * | 11/2001 | Klug | 359/24 |

FOREIGN PATENT DOCUMENTS

EP 0410968 B1 2/1989 ........... G02B/27/22

* cited by examiner

Primary Examiner—Russell Adams
Assistant Examiner—Melissa J. Koval
(74) Attorney, Agent, or Firm—Christie, Parker & Hale, LLP

(57) ABSTRACT

A system and method for enhancing the realism of a displayed image may include an image display subsystem and a shadow projector. When an image is displayed, a shadow is projected near the image so that the shadow appears to be cast by the image. Shadows and lighting effects may also be reflected within a displayed image by rendering shadows and lighting corresponding to the viewer's environment within the image before or during display.

36 Claims, 7 Drawing Sheets

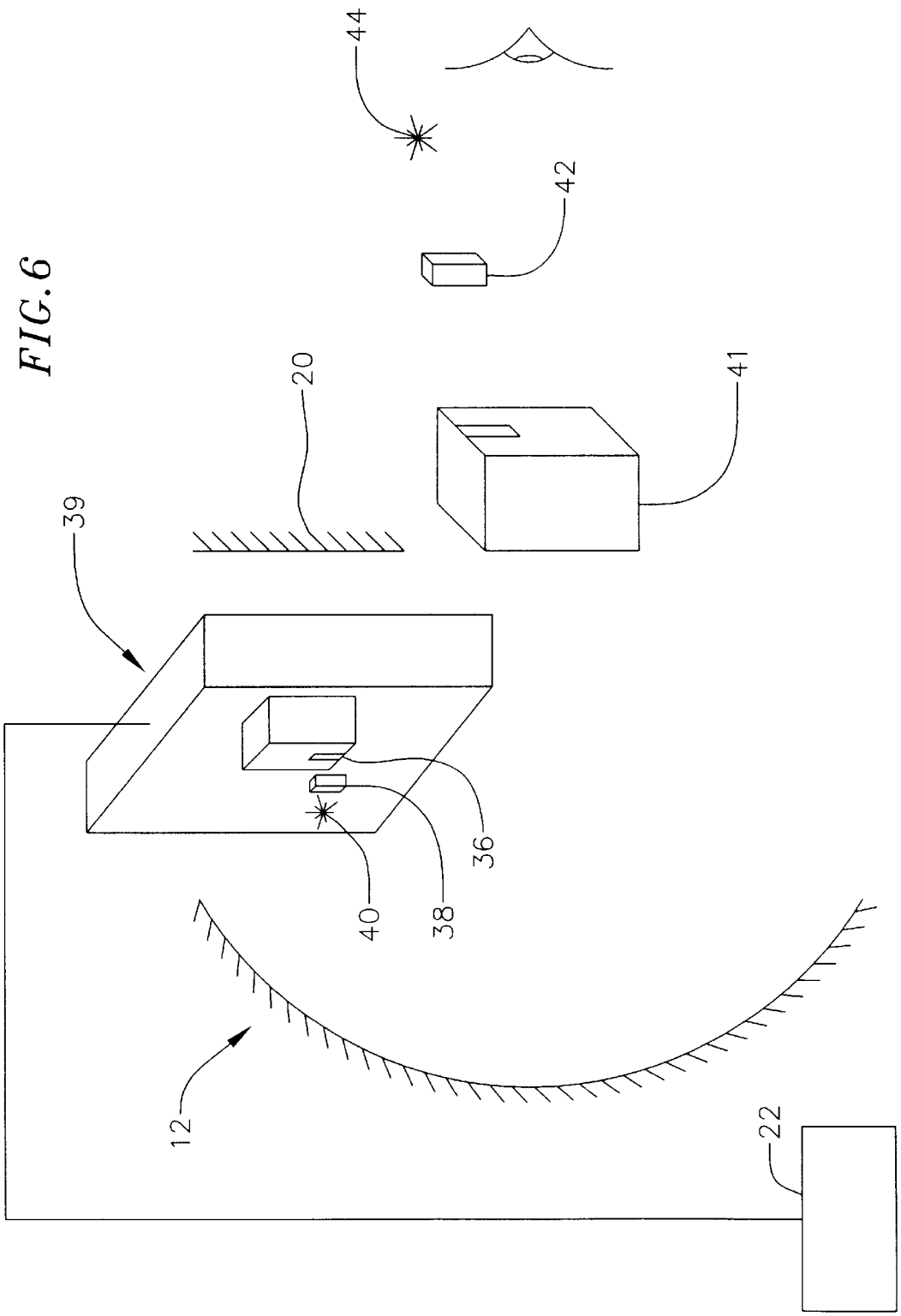

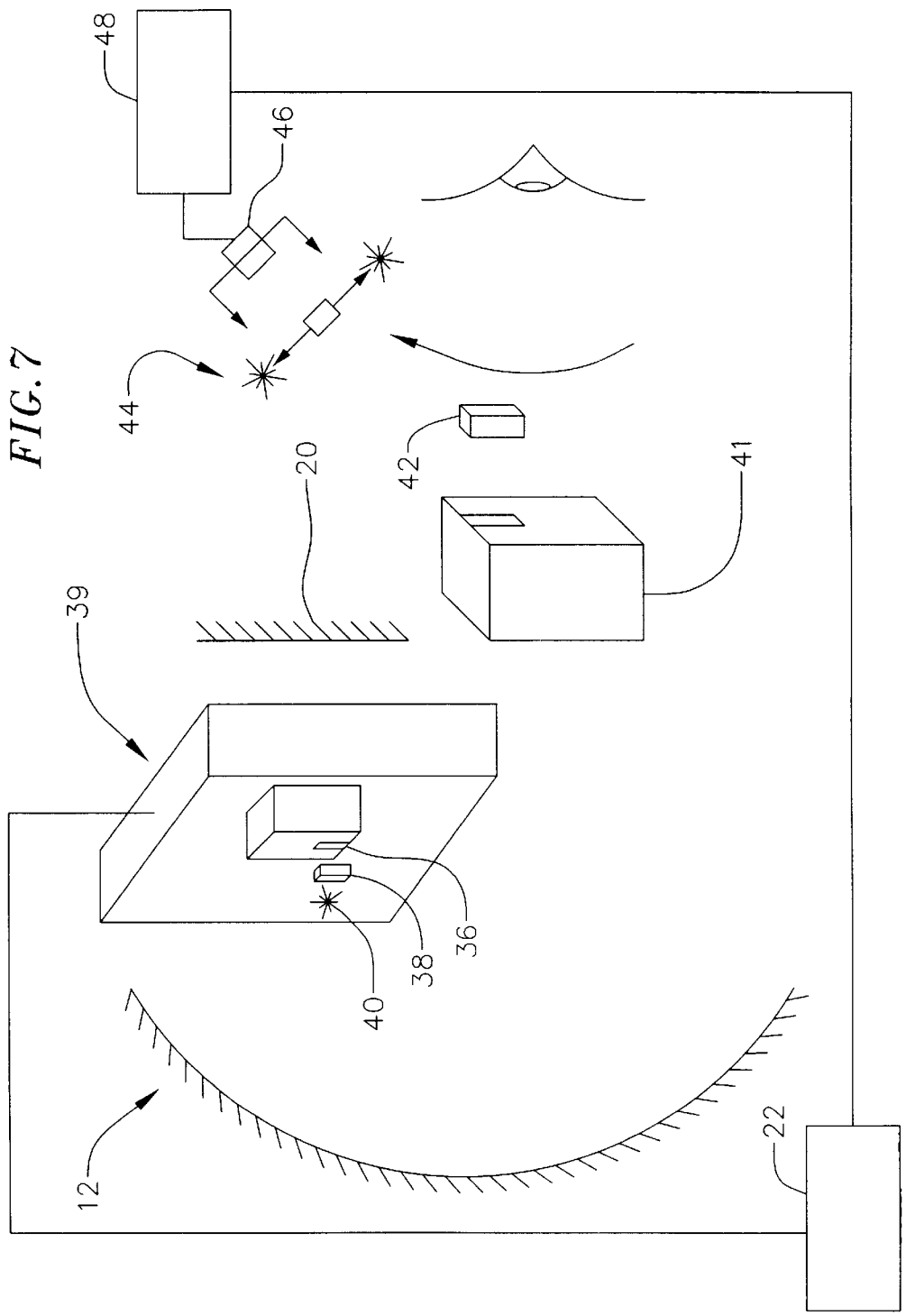

SYSTEM AND METHOD FOR ENHANCING THE REALISM OF A DISPLAYED IMAGE

FIELD OF THE INVENTION

This invention relates to image displays and more particularly to enhancing the realism of images by creating an illusion of environmental lighting effects from and on the images.

BACKGROUND OF THE INVENTION

The present invention relates to the field of optics, and this application makes use of several terms of art used throughout the field. The inventors have adopted and use the following definitions, and they are therefore included in this patent. A 'real image' is an optical image formed of real foci (Merriam-Webster's Online Collegiate Dictionary). In other words, real images are made by light rays that are brought to a focus at the image position, and therefore can be made visible on a surface, such as a screen or smoke. See Warren J. Smith, Modem Optical Engineering, 8 (McGraw-Hill 1966). A 'virtual image,' on the other hand, is an image formed of points from which divergent light rays seem to emanate without actually doing so (Merriam-Webster's Online Collegiate Dictionary). For example, the virtual image in a plane mirror is at some distance behind the mirror. Virtual images cannot be made visible on a screen because they are made by light rays that do not actually come from the location at which the image appears. See Warren J. Smith, Modem Optical Engineering, 9 (McGraw-Hill 1966). As used throughout the specification, a 'negative image' is a negative of an image, or an image having the light and dark parts in approximately inverse order to those of the original subject (Merriam-Webster's Online Collegiate Dictionary). A negative image may be created by reversing the polarity of an image, digital signal processing, or forming a two-dimensional 'gobo,' which is an opaque cut-out resembling the original subject to be placed near a light source. A 'focal plane' is a plane that is perpendicular to the axis of a lens or mirror and passes through the focus of the lens or mirror (Merriam-Webster's Online Collegiate Dictionary).

Movies, slides, video, and other displayed images have long been a major source of audience entertainment. Much effort has been expended to make images appear more like objects in three-dimensional space in order to make them more compelling to the viewer, and thereby increase the entertainment value of such images. A variety of techniques have been employed to cause displayed images to appear more like objects in three-dimensional space. One technique is to create "aerial" images, which are virtual images that are projected into free space, producing the illusion of a three-dimensional hologram. Such virtual images are typically created using concave mirrors and positive lenses that form images of, for example, physical objects, film projections or video screens. Examples of such a technique can be found in Krause et al., U.S. Pat. No. 5,944,403 and Orlandi, European Patent No. EP-B1-0 410 968.

Another technique to enhance the illusion of realism of displayed images is to clearly establish the distance between the viewer and the image to create an illusion of image depth. One method for creating such an illusion is to place physical objects near the plane of focus of the image in order to establish the relative depth from the image and the object to the viewer. Another method is to place a semi-transparent scrim between the optical objective and the image, and to project an image on the scrim that emphasizes the position of the image relative to the scrim.

Although these techniques succeed to one degree or another in making images more compelling, the images still appear unrealistic because the lighting in and around the images does not match the surrounding environment. In particular, images do not cast a shadow on their surroundings, nor do they contain shadows or reflect lighting effects from light sources in their environments.

SUMMARY OF THE INVENTION

To overcome the limitations in the prior art described above, the present invention discloses a system and method for enhancing the realism of displayed images by reflecting lighting effects from the displayed image's environment in and around the image.

Specifically, in one embodiment of the invention, the system comprises an image display subsystem and a shadow projector. The image display subsystem may be, for example, a virtual or real image projector or video display, and it may display an aerial image or a real image. The shadow projector may be, for example, a slide, film, or video projector or a theatrical lighting fixture with gobo. The shadow projector projects a second image, which may be from a photographic negative or an inversion of the signal of the displayed image, near the displayed image such that the second image appears to be a shadow of the displayed image. Since real shadows are created only by physical objects, the displayed image appears more like an object in three-dimensional space.

The "shadow" projected by the shadow projector can be made to correspond with the shape, alignment, movement, and perspective of an object or image relative to a real or virtual light source. By a "virtual light source," the inventors mean a light source within an image. For example, a virtual light source may be a sun projected on a movie screen. With a second image source comprising fixed media, for example, a gobo or slide, the source can be changed in discrete steps with the movement of a light source or the image. When the second image source comprises continuous media, for example, video or film, the image correspondence may take place continuously. By corresponding the shadow image to the displayed image, the image appears to cast a realistic shadow, further enhancing the illusion of realism.

In another embodiment of the invention, the displayed image contains a virtual light source. The shadow projector projects a shadow near either an object image within the displayed image or a real object near the displayed image, such that the "shadow" appears to be cast from the virtual light source. This creates an illusion that the virtual light source is a real light source, and further enhances the realism of the image.

An alternative embodiment comprises an image display subsystem and a first image source. The lighting and shadows from light sources and physical objects in the viewer's environment are integrated into the image. When displayed, the image contains realistic lighting and shadows from the viewer's environment. This enhances the realism of the display by creating an illusion that the image is lighted by the environmental light sources or shadowed by real objects in its environment.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 6 illustrates an alternative embodiment of the system in FIG. 5, wherein the object, shadow, and virtual light source are rendered on an electronic display device by a video source before being projected; and FIG. 7 illustrates an alternative embodiment of the system of FIG. 6, wherein the virtual light source is rendered to correspond with a moving environmental light source.

DETAILED DESCRIPTION OF THE PREFERRED EMBODIMENTS

The invention summarized above and defined by the enumerated claims may be better understood by referring to the following detailed description, which should be read in conjunction with the accompanying drawings. This detailed description of particular preferred embodiments, set out below to enable one to practice the invention, is not intended to limit the enumerated claims, but to serve as particular examples thereof. It is to be understood that other embodiments may be utilized as changes may be made without departing from the scope of the present invention.

Figure 1:
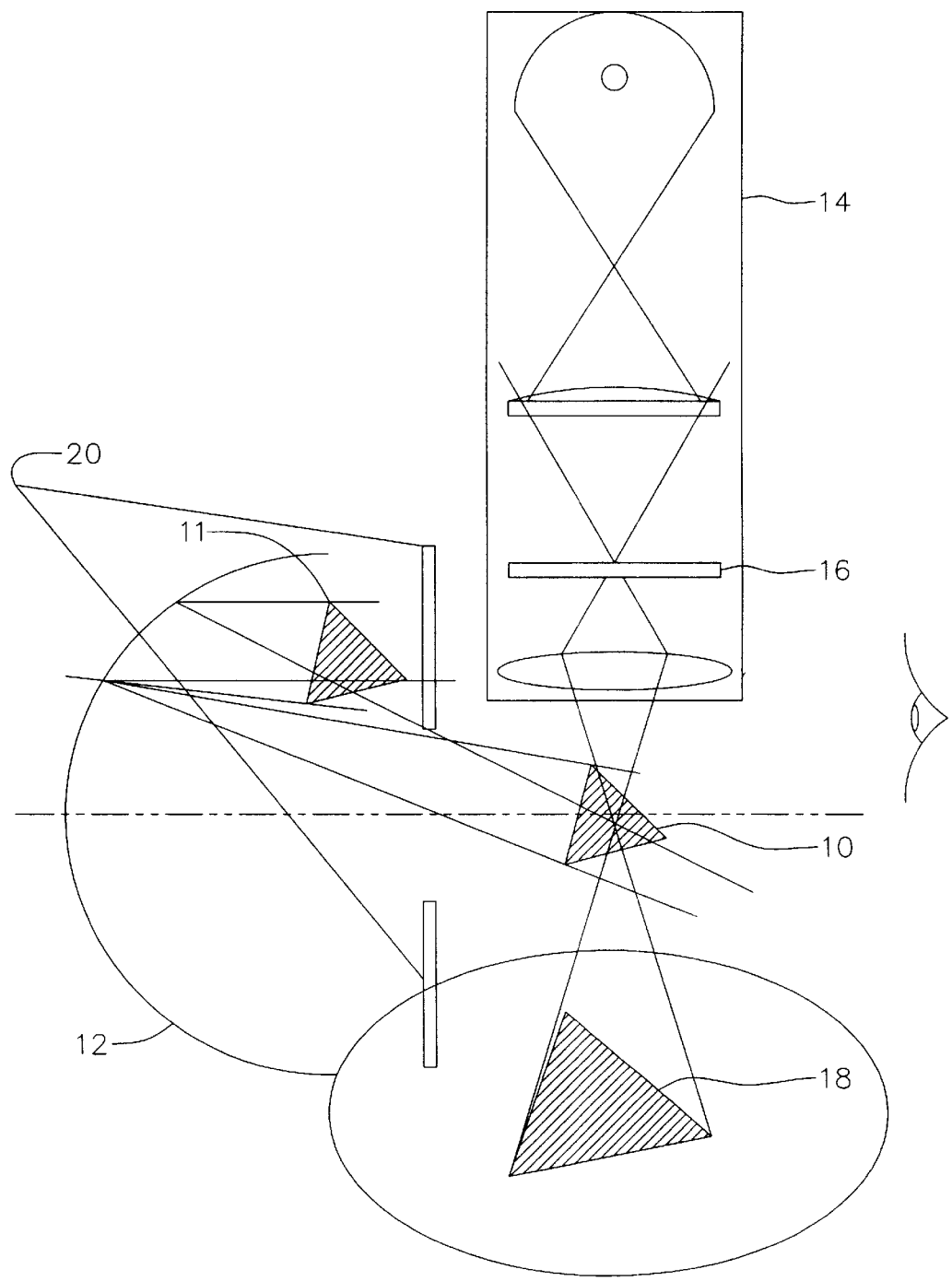
FIG. 1 illustrates one embodiment of the invention, wherein a virtual image projector projects an image of an object and a shadow projector casts the negative of the image in the direction of the image such that it appears to be a shadow of the image.

FIG. 1 illustrates one embodiment of the present invention. An aerial image 10 of a real object 11 is displayed by an image display subsystem 12. In this embodiment, the image display subsystem 12 is a virtual image projector, using a concave mirror. A shadow projector 14 has a focal plane containing a negative image 16 of the aerial image 10. The shadow projector 14 is positioned in the proximity of the aerial image 10 such that projection of the negative image 16 appears to create a shadow 18 of the image 10. In this embodiment, the shadow projector 14 is a film slide projector. The shape and size of the negative image 16 and resulting projected image or shadow 18 are configured to be appropriate for the geometrical relationship of the shadow projector 14 and the image 10. A baffle or scrim 20 is added as shown to shield the object 11 from view. The object 11 may be replaced by a real image displayed or projected on a screen. The image 10 may alternatively be a real image. The image display subsystem 12 may alternatively be a virtual image projector using a positive lens, or a real image display, for example, a film slide projector, motion picture film projector, video projector, or a display from an electronic display device. The shadow projector 14 can also be, for example, a theatrical lighting fixture with a gobo, motion picture film projector, or video projector displaying an electronically stored negative image.

Figure 2:
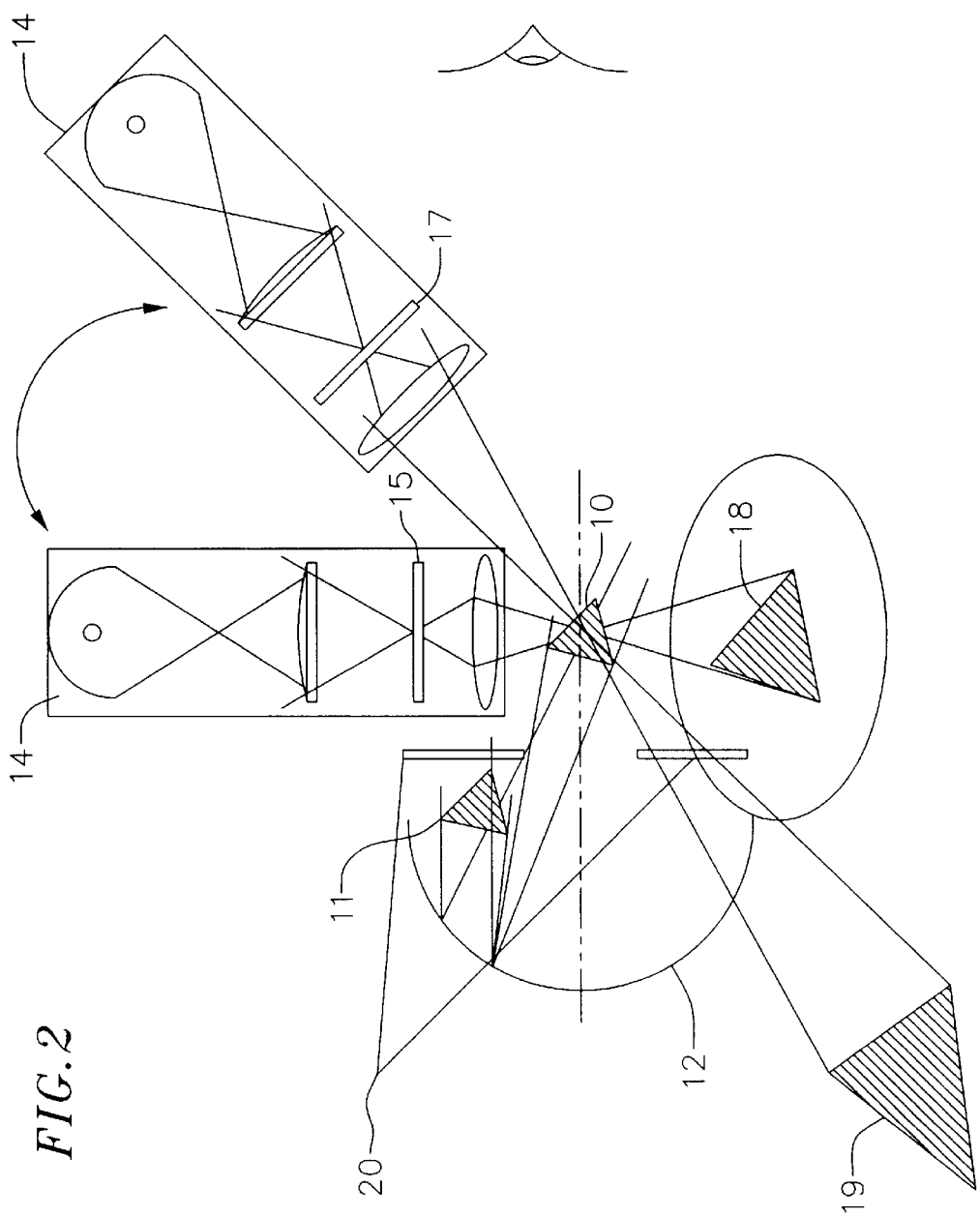
FIG. 2 illustrates an alternative embodiment of the system shown in FIG. 1, wherein the apparent shadow moves as the shadow projector changes its projection angle.

FIG. 2 illustrates the movement of the shadow projector 14 shown in FIG. 1 to a new position and alignment. The corresponding change in shape and orientation of the projected shadow 19 is also shown. As the shadow projector 14 moves, the negative image 15 changes as needed to maintain proper perspective. If the shadow projector 14 uses fixed media, such as a transparency slide or gobo, then the transformation of the negative image 15 can be accomplished in discrete steps by substituting different fixed negative images (15, 17) as necessary at each new position of the shadow projector 14. If the negative image 15 is continuously variable, as with motion picture film or video, then the motion of the shadow projector 14 and the shadow 19 can be accomplished continuously. By changing the shape of the negative image 15 as the shadow projector 14 is moved, such that the contour of the shadow 19 accurately represents the perspective of the geometry of the shadow projector and image, the realism of the aerial image can be further enhanced.

Figure 3:
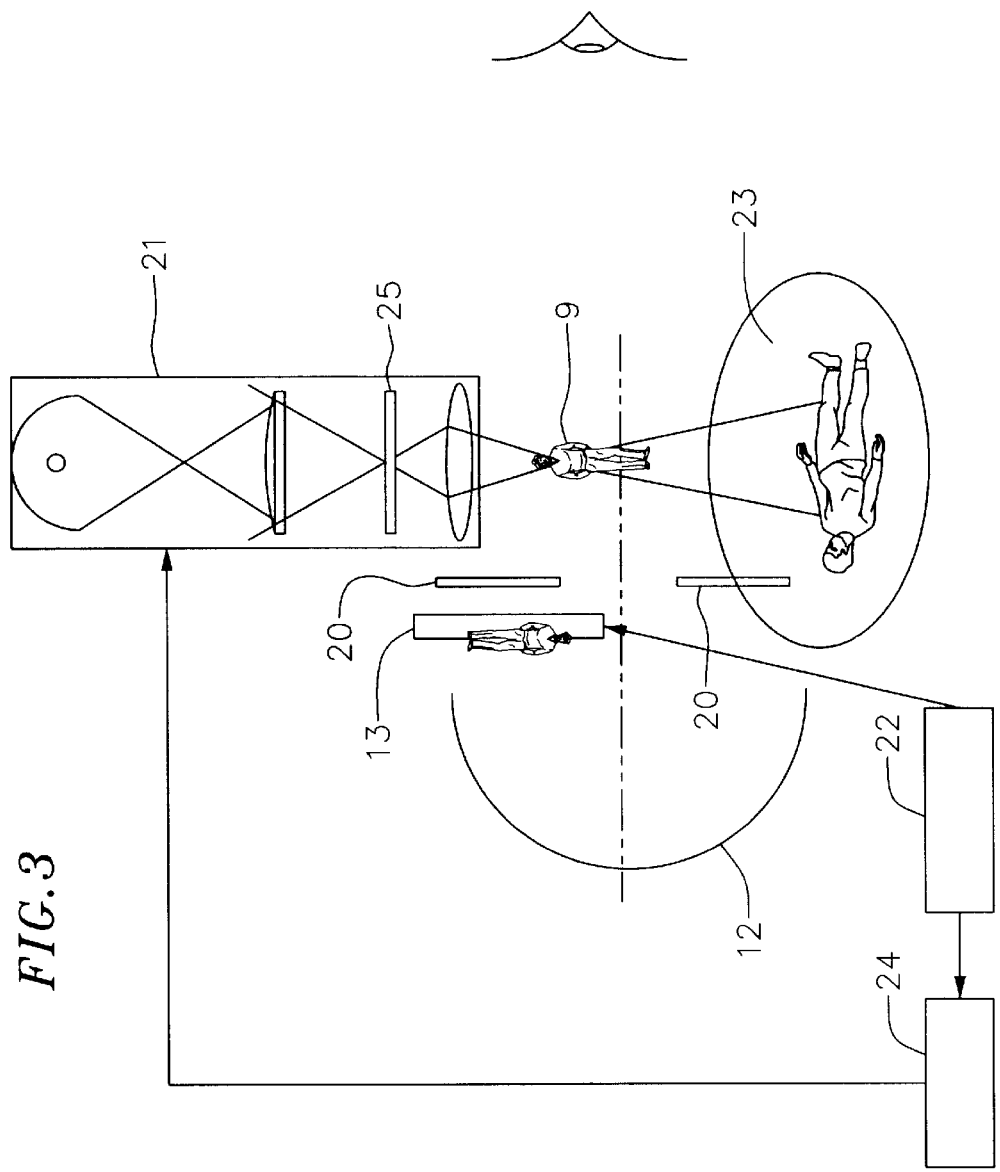
FIG. 3 illustrates another embodiment of the invention, wherein both the image display projected by the virtual image projector and an inverter are driven by the same video storage device.

FIG. 3 illustrates another embodiment of the invention. The image display subsystem 12 displays an aerial image 9 of a real image 13, for example, a moving picture displayed on a screen. A video source 22 drives both the real image 13 display and an inverter 24. The inverter 24 reverses the polarity of the video source 22 using digital signal processing, and outputs the signal to the shadow projector 21. The shadow projector 21 projects the inverted signal of the real image 13 as a shadow 23 in the proximity of the displayed image 9, such that the shadow 23 appears to be cast by the displayed image 9. By using the video source 22 as a source for both the displayed image 9 and the shadow 23, moving pictures and their shadows can be easily synchronized. The simplicity of the system is also increased, avoiding the need for a separate image source 25 for the shadow projector 21.

Synchronization may also be accomplished without using an inverter 24. When both the image display subsystem 12 and the shadow projector 21 are film or slide projectors, the negative of the film used for the image display can be created and used as the source 25 for the shadow projector 21. The image 9 may alternatively be a real image. The image display subsystem 12 may alternatively be a virtual image projector using a positive lens, or a real image display, for example, a film slide projector, motion picture film projector, video projector, or a display from an electronic display device.

Figure 4:
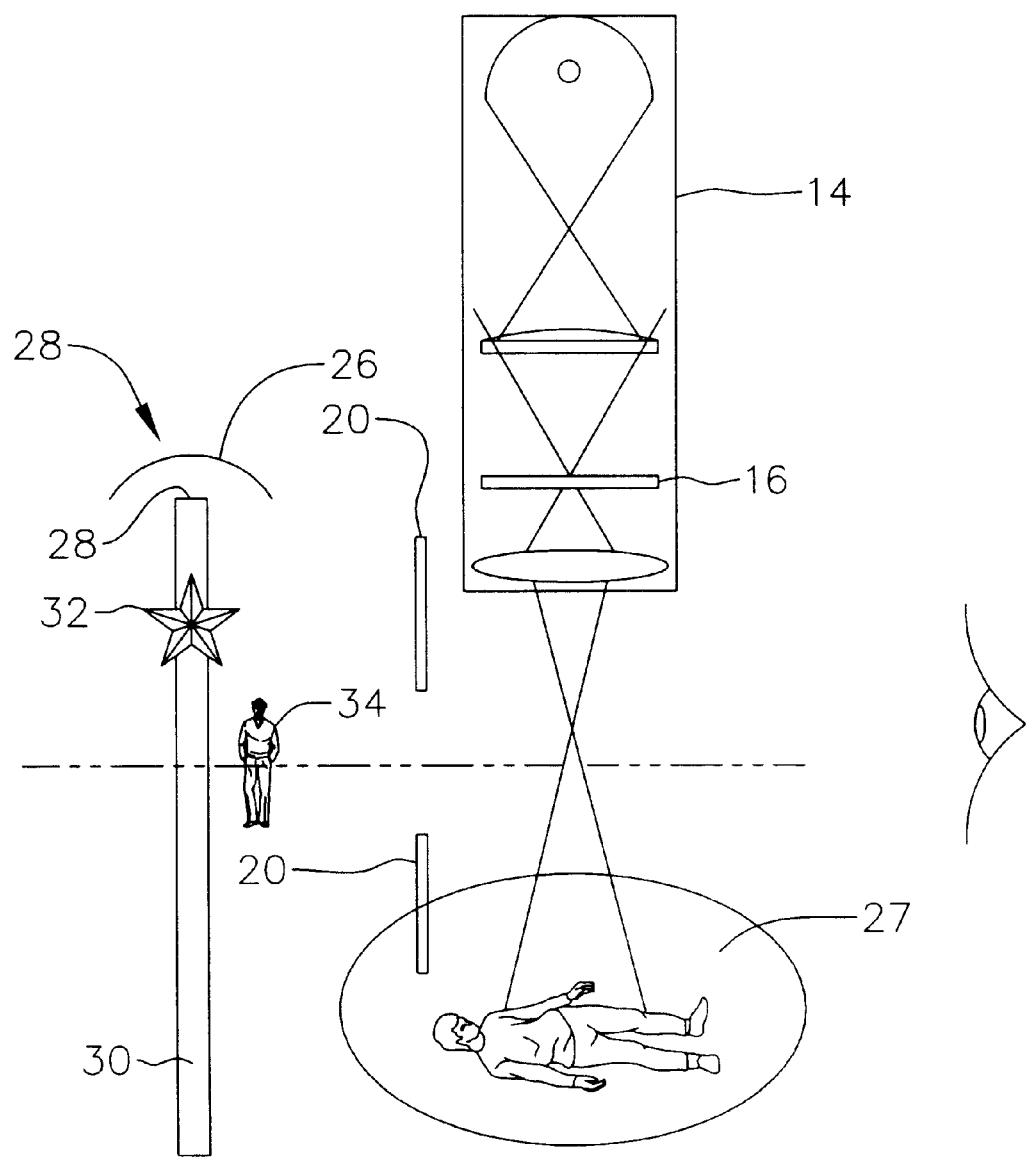
FIG. 4 illustrates another embodiment, wherein a real object is placed near an image containing a virtual light source. A shadow projector projects a shadow of the object that appears to be cast from the virtual light source.

FIG. 4 illustrates another embodiment of the invention. An image display subsystem 26 displays a real image 30 containing a virtual light source 32. An object 34 is placed near the real image 30. The shadow projector 14 projects a shadow 27 near the object 34, such that the shadow appears to be cast by the object 34 from the virtual light source 32. A shadow 27 may also be projected near an image of an object that is also contained in the real image 30. This system and method allow both real objects and images to appear to cast shadows from a virtual light source. As discussed above, the shadow projector 14 may also be a motion picture or video projector displaying a negative 16 of the film or inverted digital signal used to display the first image 28.

Figure 5:
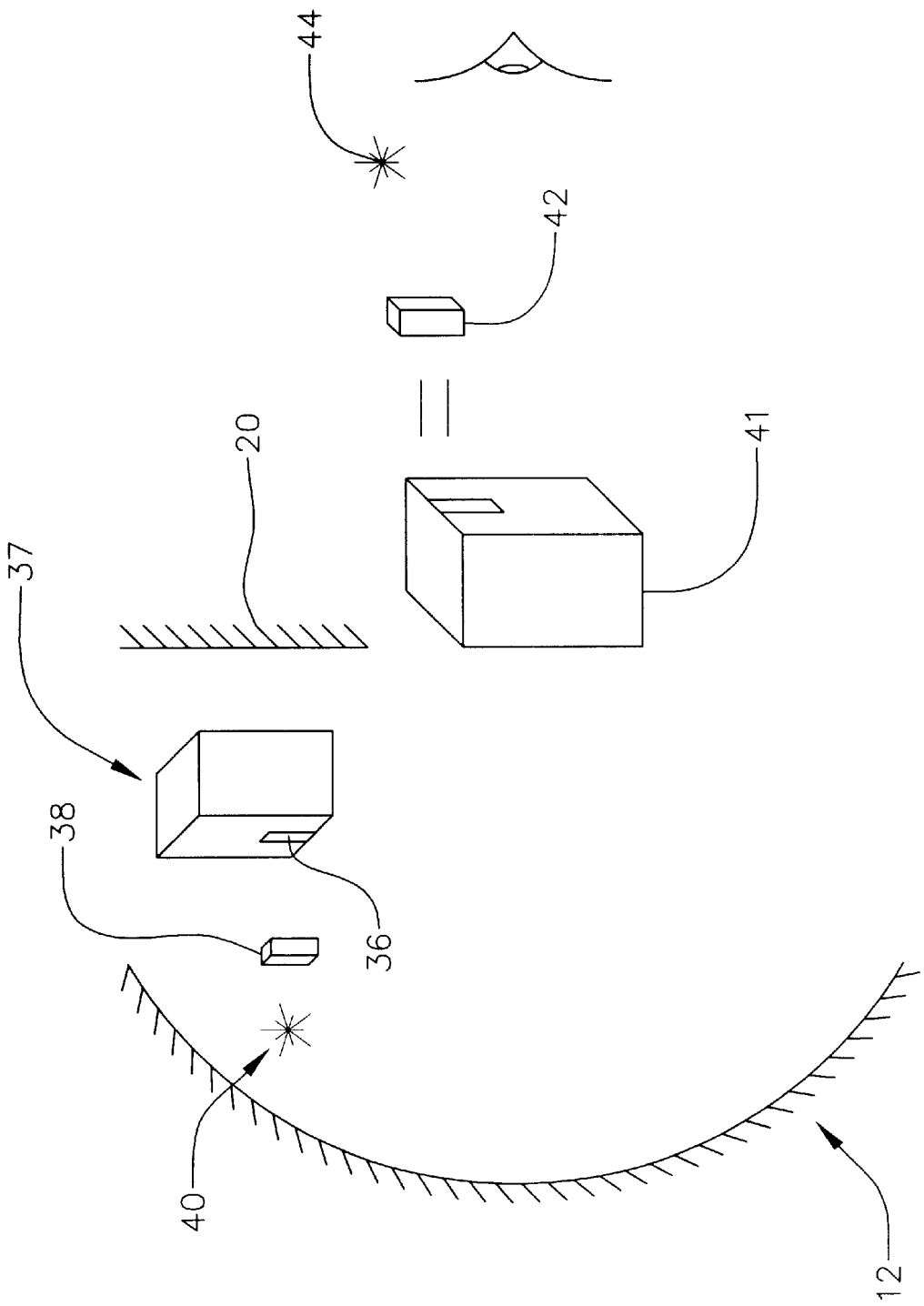
FIG. 5 illustrates another embodiment of the invention, wherein the projected image appears to contain a shadow cast by the shadow-casting object from an environmental light source.

FIG. 5 illustrates an embodiment of the invention comprising an image display subsystem 12, an image source 37, and an aerial image 41. A real shadow 36 is cast onto the image source 37 by a real object 38 from a real light source 40. The shadow 36 is aligned on the image source 37 such that, when displayed, the image 41 appears to be shadowed by a second real object 42 that is near the displayed image 41. The light source 40 is positioned so as to illuminate the image source 37 such that, when displayed, the image 41 appears to be lighted by a second light source 44 that is in the environment of the displayed image 41. The light source 40 also corresponds with the movement, brightness and color of the environmental light source 44. By reflecting environmental light sources and shadows from real objects near the displayed image in the image itself, the illusion of realism is further enhanced. The displayed image 41 may appear to be a physical object, capable of reflecting the lighting and shading of its environment.

FIG. 6 illustrates that the image source 37 of FIG. 5 may be the output 39 of a video source 22. A virtual shadow 36 is rendered on a real image display according to the perspective of a virtual light source 40 and an object image 38. The virtual light source 40 and the object image 38 are rendered on the display so as to correspond with the real light source 44 and real object 42 when the image 41 is displayed. The image source 39 may be film, slides, or an electrical signal. Rendering may be accomplished by recording images of real or computer generated objects with similar lighting on film, slides, or video storage media such as a video disc or tape, so that when the image is played back through the image display subsystem 12, the environmental lighting and shading are reflected in the image 41. Rendering may also be accomplished by generating and displaying the images in real-time. Rendering the shadows and lighting effects within an image, rather than using real objects, allows moving and more complicated images to be easily displayed.

In FIG. 7, a light source position sensor 46 senses the movement of the environmental light source 44, and outputs the position data to a light source position processor 48. The processor 48 then outputs the data to the video source 22, which renders a corresponding change in position for the virtual light source 40. Where a digital storage medium, such as a disc or solid state memory is employed, the position of the light source 44 can be used as an index to retrieve and display a prerecorded image 39 that is appropriate for the lighting geometry in the environment. Sensors may also be used to sense and output color and brightness data to the processor 48. By dynamically changing the illumination of the displayed image 41 to correspond to the environmental lighting and shading, the realism of the image is further enhanced.

In embodiments where a real-time three-dimensional computer image generator is employed as the video source 22, the position data from the light source 44 can control the position of the virtual light source 40 used to render the three-dimensional object 36, which is displayed on the display 39 and imaged by the image display subsystem 12 as an aerial image 41. The image display subsystem 12 may alternatively be a real image display, such as a display of an electronic device, slides, film or video projected on a screen, or a television screen. Such real-time image rendering enables the image 41 to reflect lighting changes as they occur, without the need of prerecording those changes.

In any of the above embodiments, the image display subsystem 12 may be a film or slide projector and screen, a television, video, or liquid crystal display screen, or a virtual image projector, projecting aerial images of the real image displays described above or of real objects.

What is claimed is:

1. A method for enhancing the realism of an aerial image of an object formed by a first optical system using a second optical system which projects a negative image of the object, the method comprising the steps of:

providing a display surface visible to a viewer's eye;

forming the aerial image spaced from said display surface, by a first optical system in a location visible to the viewer; and projecting the negative image on said display surface in a location displaced from the aerial image in a location visible to the viewer to simulate a shadow of the aerial image.

2. A method for enhancing the realism of a real image of an object formed by a first optical system using a second optical system which projects a negative image of the object, the method comprising the steps of:

providing a first and a second display surface visible to a viewer's eye;

forming the real image on said first display surface, spaced from said second display surface, in a location visible to the viewer; and projecting the negative image on said second display surface in a location displaced from the real image in a location visible to the viewer to simulate a shadow of the real image.

3. A method according to claim 1 or 2, wherein the step of projecting the negative image comprises changing the shape or location of the projected negative image in a manner realistic to the geometrical perspective of a real or virtual light source to the image formed by the first optical system.

4. A method according to claim 1 or 2 further comprising the step of generating by a first processor a first signal containing information necessary for controlling the formation of the aerial or real image of the first optical system.

5. The method of claim 4 further comprising the step of generating by the first processor or a second processor a second signal containing information necessary for controlling the projection of the negative image of the second optical system.

6. The method of claim 5, wherein the step of generating the second signal comprises digitally inverting the first signal.

7. A method according to claim 1 or 2, further comprising using a real or virtual light source, and wherein the step of projecting the negative image comprises:

moving at least one of the second optical system, light source, and the image formed by the first optical system; and changing the shape and position of the negative image projection in a manner realistic to the geometrical perspective of the light source to the image formed by the first optical system.

8. A method according to claim 1 or 2 using a light source in the location of the real or aerial image, and further comprising the step of correlating at least one of a movement, color and brightness of the light source with at least one of the lighting of the image formed by the first optical system, or the shape or location of the negative image projection.

9. The method of claim 8 using a sensor to sense the light source and a processor for processing the data received from the sensor, wherein the step of correlating comprises the steps of:

acquiring, with the sensor, data regarding the movement of the light source;

processing the data with the processor; and altering the at least one of the lighting of the image formed by the first optical system, or the shape or location of the negative image projection in a manner realistic to the geometrical relationship of the light source and the image formed by the first optical system.

10. The method of claim 9, wherein the step of correlating further comprises the step of recording the alterations on a digital storage medium.

11. The method of claim 10, further comprising the steps of:
indexing the recorded alterations with the data received from the sensor; and
displaying an indexed recorded alteration upon sensing the correlating light source position in real-time.

12. The method of claim 9, further comprising the step of displaying the alteration in real-time.

13. A method according to claim 1 or 2, wherein the step of projecting comprises transforming the negative image in discrete steps.

14. The method of claim 13, wherein transforming comprises substituting different fixed negative images into the focal plane of the second optical system.

15. A method according to claim 1 or 2, wherein the step of projecting comprises transforming the negative image projection continuously by projecting from one of a continuously variable negative image and a continuously variable signal.

16. A method for enhancing the realism of a real image of a light source formed by a first optical system using a second optical system which projects a negative image of a real object placed near the real image comprising:
providing a first and second display surface visible to a viewer's eye;
forming the real image on said first display surface by a first optical system in a location visible to the viewer; and
projecting the negative image on said second display surface in a location displaced from the real image in a location visible to the viewer to simulate a shadow cast from the light source.

17. A method for enhancing the realism of a real or aerial image of a first object formed by a first optical system in a location illuminated by a first light source comprising the steps of:
rendering illumination within the image of the first object, such that the image of the first object appears to be illuminated by the first light source; and
forming the image by the first optical system in a location visible to a viewer.

18. The method of claim 17, further comprising the steps of:
placing a second object near the location of the image; and
rendering a shadow aligned within the image of the first object such that the image appears to include a shadow cast by the second object from the light source.

19. The method of claim 17, wherein the step of rendering illumination comprises illuminating the first object with a second light source.

20. The method of claim 18, wherein the step of rendering a shadow comprises casting a shadow on the first object by a third object which is between the first object and the second light source.

21. A method according to claim 17 or 18, wherein the step of rendering comprises rendering in a real image at least one of a virtual light source and an image of a shadow.

22. An apparatus for enhancing the realism of an aerial image of an object to a viewer having his or her eye regarding a display surface comprising:
a supporting structure;
a first optical system connected to said structure positioned in relation to the object to form an aerial image of the object spaced from the display surface; and
a second optical system connected to said structure that projects a negative image of the object onto the display surface at a location within the viewer's field of view that creates the impression of a shadow relative to the aerial image.

23. An apparatus for enhancing the realism of a real image of an object to a viewer having his or her eye regarding a first and a second display surface comprising:
a supporting structure;
a first optical system connected to said structure for forming the real image of the object on the first display surface spaced from the second display surface; and
a second optical system connected to said structure for forming a negative image of the object onto the second display surface at a location within the viewer's field of view that creates the impression of a shadow relative to the real image.

24. An apparatus according to claim 22 or 23, further comprising a light source, wherein the second optical system is aligned in relation to the light source and the image formed by the first optical system such that the projected negative image has the appearance of a shadow of the image formed by the first optical display system cast by the light source.

25. The apparatus of claim 24, wherein the light source is a virtual light source within the image formed by the first optical system.

26. An apparatus according to claim 22 or 23, further comprising:
a processor, coupled to the first optical system, to generate a signal representative of the real or aerial image; and
a signal inverter, coupled to the processor and the second optical system, to invert the signal and input the inverted signal into the second optical system.

27. An apparatus for enhancing the realism of a real image comprising:
a supporting structure;
a display surface connected to said supporting structure and visible to a viewer;
an optical system to form a real image on said display surface connected to said supporting structure, the real image including an image of a shadow; and
a first object connected to said supporting structure in a location visible to the viewer;
wherein said image of a shadow is aligned within the real image such that said object appears to cast a shadow on the real image.

28. An apparatus for enhancing the realism of an aerial image comprising:
a supporting structure;
a first optical system connected to said supporting structure to form an aerial image in a location spaced from said supporting structure and visible to a viewer, the aerial image including an image of a shadow; and
a first object connected to said supporting structure in a location visible to the viewer;
wherein said image of a shadow is aligned within the aerial image such that said object appears to cast a shadow on the aerial image.

29. The apparatus of claim 28, further comprising a first light source illuminating the surroundings of the aerial image, connected to said supporting structure, wherein said image of a shadow is further aligned within the aerial image such that it appears to be cast from the first light source onto the aerial image.

30. An apparatus according to claim 28 or 29, further comprising:
   a second object connected to said supporting structure, positioned in relation to said first optical system such that said first optical system forms an aerial image of said second object;
   a second light source connected to said supporting structure in a location spaced from said second object; and
   a third object connected to said supporting structure, positioned in relation to said second object and said second light source such that said third object casts a shadow on said second object;
   wherein said shadow is aligned on said second object such that the aerial image includes said image of a shadow.

31. An apparatus according to claim 28 or 29, further comprising:
   a first display surface connected to said supporting structure, positioned in relation to said first optical system such that said first optical system forms an aerial image of the first display surface; and
   a second optical system connected to said supporting structure for forming a real image of said image of a shadow on said first display surface;
   wherein said image of a shadow is aligned within said real image such that the aerial image includes said image of a shadow.

32. An apparatus for enhancing the realism of a real image comprising:
   a supporting structure;
   a display surface connected to said supporting structure and visible to a viewer;
   an optical system to form a real image on said display surface connected to said supporting structure, the real image including an image of an illuminated object; and
   a first light source illuminating the surroundings of the real image, connected to said supporting structure;
   wherein said image of an object is illuminated within the real image such that said first light source appears to illuminate the real image.

33. An apparatus for enhancing the realism of an aerial image comprising:
   a supporting structure;
   a first optical system connected to said supporting structure to form an aerial image in a location spaced from said supporting structure and visible to a viewer, the aerial image including an image of an illuminated object; and
   a first light source illuminating the surroundings of the aerial image, connected to said supporting structure in a location visible to the viewer;
   wherein said image of an object is illuminated within the aerial image such that said first light source appears to illuminate the aerial image.

34. The apparatus of claim 33, further comprising:
   an object connected to said supporting structure, positioned in relation to said first optical system such that said first optical system forms an aerial image of said object; and
   a second light source illuminating said object, connected to said supporting structure in a location spaced from said object;
   wherein said object is illuminated by said second light source such that the aerial image includes said image of an illuminated object.

35. The apparatus of claim 33, further comprising:
   a first display surface connected to said supporting structure, positioned in relation to said first optical system such that said first optical system forms an aerial image of the first display surface; and
   a second optical system connected to said supporting structure for forming a real image of said image of an illuminated object on said first display surface.

36. An apparatus according to claim 32 or 33, further comprising:
   a sensor, coupled to said first light source, for sensing at least one of the location, brightness, color, and alignment of said first light source; and
   a processor, coupled to said sensor and said first optical system, for processing data received from said sensor and rendering illumination on said real or aerial image to correspond with said at least one of the location, brightness, color, and alignment of said first light source.

* * * * *